United States Patent [19]

Chung et al.

[11] Patent Number: 5,644,721

[45] Date of Patent: Jul. 1, 1997

[54] MULTIPLE CURRENCY TRAVEL RESERVATION INFORMATION MANAGEMENT SYSTEM AND METHOD

[75] Inventors: Kieran Sebastian Chung, Plantation; Phillip Mark Perez Megofna, Sunrise; Bhagirath Nirmalsinh Gohil, Miami; Jose Bernos, Miami Beach, all of Fla.

[73] Assignee: System One Information Management, L.L.C., Houston, Tex.

[21] Appl. No.: 521,354

[22] Filed: Aug. 30, 1995

[51] Int. Cl.$^6$ ................................................ G06F 17/60
[52] U.S. Cl. ..................... 395/206; 395/205; 395/651
[58] Field of Search ................................. 364/407, 401, 364/408; 395/650

[56] References Cited

U.S. PATENT DOCUMENTS

| | | | |
|---|---|---|---|
| 4,827,404 | 5/1989 | Barstow et al. | 364/407 |
| 4,862,357 | 8/1989 | Ahlstrom et al. | 364/407 |
| 4,885,685 | 12/1989 | Wolfberg et al. | 364/401 |
| 4,922,439 | 5/1990 | Greenblatt | 364/407 |

(List continued on next page.)

FOREIGN PATENT DOCUMENTS

| | | |
|---|---|---|
| 0 660 251 A2 | 6/1995 | European Pat. Off. . |
| WO95/12175 | 5/1995 | WIPO . |

OTHER PUBLICATIONS

System One, (1994, Apr. 22–24). IMS brochure.

System One, (1994, Apr. 22). news Releases. *System One Introduces Smartmail to Travel Agencies Interested in Saving Time, Reducing Errors & Attracting More Business*, pp. 1–3.

Brisson, Mary, (1994, Apr. 18). Business Travel News. *System One Reinvents itself*, p. 1 (continued) *System One's New Self–View: Info Provider*, p. 32, issues 286.

Fairlie, Rik, (1994, Mar. 21). Travel Weekly. *System One Moves to Synergize its Systems, Software*, p. 51 (continued) System One Plans Service–Bureau Approach for Some Products, p. 54.

Finlay, Douglas, (1994, Jan. 10). Travel Agent. *RES Systems/Automation Upgrading the System*.

Finlay, Douglas, (1993, Nov. 8). Travel Agent. *From CRS to IMS*.

Amadeus Global Travel Distribution, *Product Guide—AmadeusPro Sale*.

"System Brings you the Most Complete Travel and Financial Information Management System On the Globe", brochure, distributed Nov., 1994.

"Global MAX Consolidates Travel Information From Around the World to Help you Manage and Expand Yours", brochure, distributed May, 1995.

PCT International Search Report (Nov. 29, 1996).

"Study of Airline Commuter Reservation System". May 1988.

"Clovia, Galileo sign global travel–information deal" Feb. 1993, by Grace, Tim.

"An Accounting Masterpiece?" Oct. 1992; by Mantel, K.

*Primary Examiner*—Gail O. Hayes
*Assistant Examiner*—Gita Shingala
*Attorney, Agent, or Firm*—Fish & Richardson P.C.

[57] ABSTRACT

Methods and system for effecting the consolidation of travel reservation information including bookings and ticketing using different currencies is disclosed. Specifically, a method is disclosed in which travel reservation information is generated in a computer reservation system (CRS), the prices of which are represented in a predetermined global currency, and subsequently stored in a global data storage medium, such as a database. The information generated from the CRS can be pre-ticketed or ticketed. The information can be generated from more that one CRS. The system that is disclosed includes a global data storage medium, in which pricing information regarding travel reservations generated in at least one CRS is represent in a global currency and is stored. Each CRS is accessed by at least one locally operated computer system to generate the travel reservation information.

25 Claims, 11 Drawing Sheets

U.S. PATENT DOCUMENTS

| | | | |
|---|---|---|---|
| 4,937,743 | 6/1990 | Rassman | 364/401 |
| 5,125,091 | 6/1992 | Staas et al. | 395/650 |
| 5,191,523 | 3/1993 | Whitesage | 364/407 |
| 5,237,499 | 8/1993 | Garback | 364/407 |
| 5,253,166 | 10/1993 | Dettelbach et al. | 364/407 |

Batch Entry Database
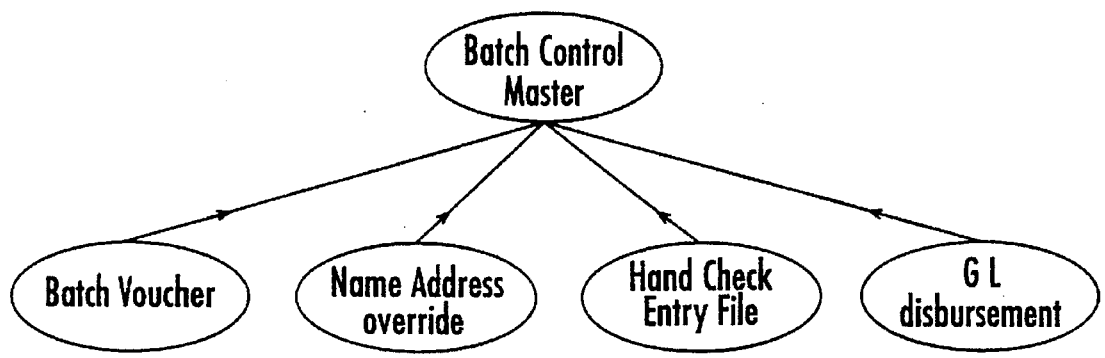
FIG. 1B
Master Database
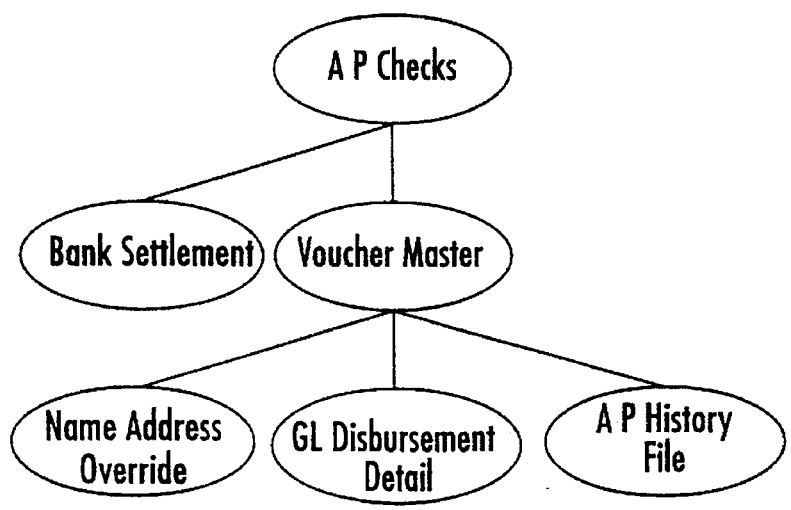
 Daily voucher and check file
FIG. 1C

Batch Entry Database
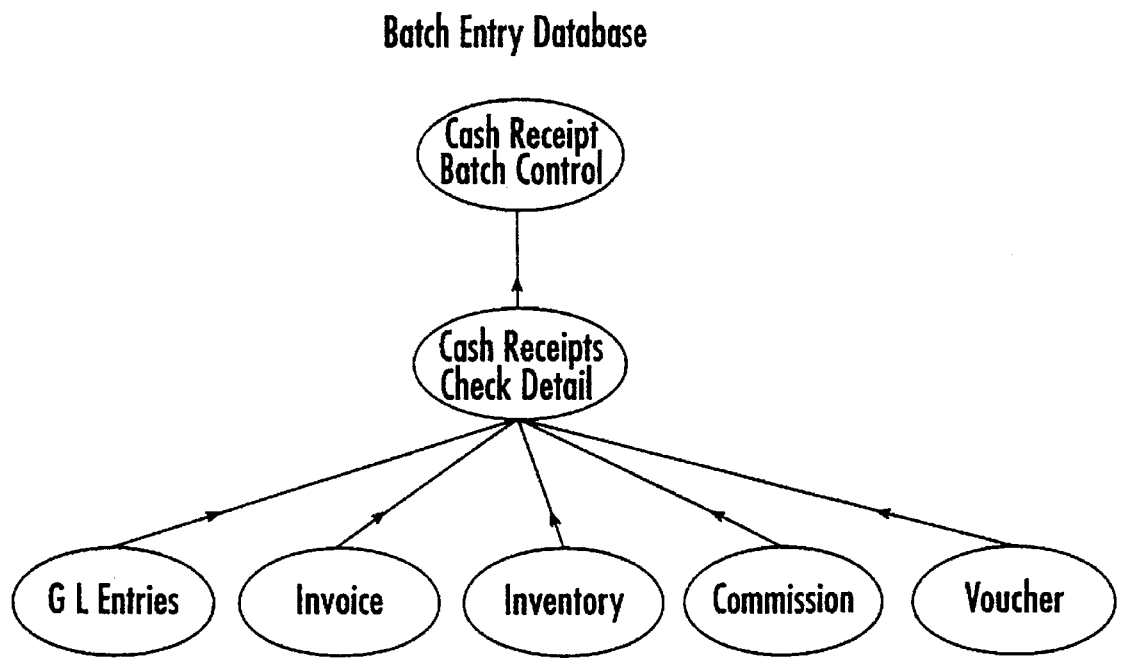
FIG. 1D
Master Database
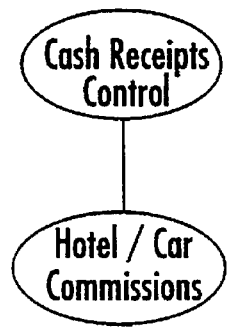
 A/R aging periods
FIG. 1E

FIG. 4

```
SALES PERSON : 32            ITINERARY           DATE: 30 APR 90

CUSTOMER NBR : 010200        QKSOBV   PAGE : 1

TO :   ABC COMPANY
       25701 ABC PARK DR
       BEACHWOOD OH 44122

FOR : TRAVELER / JOHN   REF : 4150        ADV : AH1D8730

02 MAY 90 - WEDNESDAY

AIR   DELTA AIR LINES INC  FLT : 379 COACH
            LV  CLEVELAND             715A   EQP : 727 STRETCH
            AR  CINCINNATI            813A   NON-STOP

AIR   DELTA AIR LINES INC  FLT : 379 COACH      BREAKFAST
            LV  CINCINNATI            905A   EQP : 737 STRETCH
            AR  HOUSTON  HOBBY       1030A   NON-STOP

CAR   OKLAHOMA CITY NATIONAL CAR RENTAL     1-STD CAR AUTO A/C
            PICK UP - 6P
            RETURN - 03 MAY
            CONFIRMATION NUMBER  0525607545

HOTEL ES EMBASSY SUITES OKLAHOMA CI   01 NIGHT OUT - 03 MAY
            OKLAHOMA CITY                1 ROOM CORPORATE
            1815 SOUTH MERIDIAN          RATE - 75.00 PER NIGHT
            OKLAHOMA CITY OK 73108       GUARANTEED LATE ARRIVAL
            FONE 405 - 582 - 6000        CONFIRMATION 64469071

03 MAY 90 - THURSDAY

AIR   UNITED AIRLINES FLT : 2872 ECONOMY
            LV  HOUSTON  HOBBY         310P   EQP : ATP PROPLR
            AR  CHICAGO  OHARE         400P   NON-STOP

UNITED AIRLINES FLT : 998 ECONOMY
            LV  CHICAGO  OHARE         505P   EQP : DC-8 STRETCH
            AR  CLEVELAND              716P   NON-STOP
              RESERVED SEATS  21B

U1 - DEPT 4150
U2 - AUTH. 1249
U3 - 0425 A1 C5 H5 T2 / Y
U4 - 928        FARE
U5 - 1044       COACH FARE
U6 - 928        LOW FARE
U7 - 45         DAILY RATE
```

Interface Record Transaction #      880    Date: 6/06/95
Time: 15:16:23

(An "!" indicates a carriage return character)

AIR6#010  !
180181                        !
062537#062537!
HDQ1SHIDB3#00444511#400006!
A-MEXICANA AIRLINES#MX1326##!
B-M:AMX#O#EXCH#P15###!
C-0055X AA-AA-6E!
D-022495#022495#041895!
E-CK!
F-!
G-EXCH#X#!
H-0100AXOAXACA-MEX.#MX7912Y 03DEC0320P0750P03DEG#OK#SS#3#D9S##QA
AEROCARIBE
                !
H-020CUNCANCUN MEX.#MX7911Y 07DEC0940A015P07DEG#OK#SS#3#DS9##QA
AEROCARIBE
                !
FDOAXOAXACA-MEX.!
I-MATHIESON/PMRS#ADT#    !
S-!
T-T1323688000095
                !
V-233
       !
J-!
K-USD408.00#MXN2571.00#MX96.45#XV84.52##MXN2751.97!
L-MX96.45/XV84.52##!
M-Y12#Y12!
N-204.00#204.00!
O-XXXX#XXXX!
Q-3DEC95 OAK MX CUN204.00MX OAX204.00SUD408.00END!
X-10870085431!
*CM 10!
*FP CK!
*AN 400006!
*OI 1323398777222/00444511/23FEB!
*IE 1323398777222!
*AD MXN1120.00 ADD COLLECT!
*AG 46!
*EX CHECK/100.00/20.00/C10!
*END!

FIG. 5

Support Files Structure
Agent Database Structure

Branch Structure

Customer/Vendor Structure

MULTIPLE CURRENCY TRAVEL RESERVATION INFORMATION MANAGEMENT SYSTEM AND METHOD

STATEMENT OF FIELD OF THE INVENTION

This invention relates generally to the field of computerized travel reservation information management systems and, more particularly to such a system for automatically consolidating travel reservation information that is generated in different currencies.

DESCRIPTION OF THE RELEVANT PRIOR ART

With the advent of a global economy and associated global competition, corporations all over the world and particularly in the United States are being forced to re-evaluate their corporate philosophy in light of their competitive position. As a result, corporate down-sizing and automation have occurred. However, the one area, travel and entertainment ("T&E") expenditures, that makes up a large if not the largest percentage of corporate expenditure for many corporations is not being monitored as closely as some other areas to achieve reduced overall corporate expenditures. This lack of monitoring is not due to oversight, but is due to the inability to access their corporate travel expenses, particularly expense generated in foreign countries, efficiently and accurately in sufficient time to take advantage of price saving measures to develop strategic travel policy.

As the travel industry has become highly competitive, characterized by airline deregulation and over capacity, travelers have been able to take advantage of fare wars and the ability to obtain significant discounts for services negotiated in advance and discount rates for the advanced booking of travel packages including airfare, hotel, and ground transportation. The incentives encourage travelers to book travel plans well in advance of their departure dates through their travel agents. However, due to the unpredictable travel demands of the corporate international traveler, many times advanced purchases are impractical, if not impossible.

Therefore, in order to attract the corporate business traveler, airlines, hotels, car rental agencies, and other travel related suppliers offer volume discounted rates. Most of the time the volume discounts are negotiated based on the volume of travel taken in the preceding months or years. Corporations, thus, require detailed tracking from an entity (either an internal travel department or a travel agency) booking and ticketing the travel arrangements. The following explanation of the travel arranging process will show some of the difficulties experienced with obtaining this information.

Most available travel reservation systems include software that allows a travel agent to acquire any travel information requested by their customer by utilizing a locally operated computer system to access a remote computerized reservation system ("CRS"), the functions and capabilities of which are well known to those of ordinary skill in the art. CRSs provide information on the availability and price of commercial airline flights, ground transportation, and lodging and allows the agent to book and ticket reservations from the CRS. Once booked, the reservations are maintained in most CRSs until after the travel is complete.

Each locally operated computer system that is configured for connection to the CRS is assigned a user or agency identification number ("ID"). An agency profile corresponding to the agency ID, is stored at the CRS host computer system. The profile contains relevant information regarding the agency, including data paths and security access codes. One specific type of information available that is critical to the ticket issuing process is the type of currency used for the price of the ticket. A single CRS supports both agencies and service providers (such as airlines, hotels, and car rental agencies) in many countries or geopolitical entities, each of which typically transacts business in the currency of their respective countries. Therefore, the agency profile contains the reporting currency for the CRS that is used when reporting prices and issuing tickets.

Typically, when the CRS is accessed to book a reservation, the travel agent enters all relevant information regarding the travel plan including the traveler's name, destination, departure date, arrival date, type of ticket being purchased (i.e., non-refundable, non-transferable, etc.), method of payment, and ticketing date. To expedite this process, most CRSs have much of this information stored in a customer profile so that the travel agent will not have to re-enter any common information each time a reservation is made.

When booking a reservation, this information is stored in a passenger name record ("PNR"). Then once a reservation is booked, a ticket can be generated from the CRS or other systems.

In response to the need for reconciling travel agency accounting records with information initially booked in the CRS regarding the travel reservations entered by that agency, it has become the standard practice in the travel industry to make this travel reservation information in the CRS available for analysis once the airline ticket issues. For example, travel information accounting systems, commonly referred to in the travel industry as back office systems, have been developed to interface information from the CRS (typically sent from the CRS in the form of an accounting interface record ("AIR")) into a local database after a ticket issues, so that the information can be analyzed for accounting, regulatory reporting, and management information purposes. The MAX back-office system, developed by the assignee of this invention, is an example of such a system. Most of the existing travel information accounting systems only deal with post-ticketed data, however, some systems provide access to pre-ticketed data.

The term "pre-ticketed" refers to the time before an airline ticket is issued and the term "pre-invoice" refers to the time before an invoice is issued on, for example a rental car or hotel reservation. However, the travel industry generally refers to both pre-ticketed and pre-invoice information as pre-ticketed information. All references to pre-ticketed information hereafter will include both pre-ticketed and pre-invoice information.

With the increasing emphasis on reducing travel costs, the need for access to pre-ticketed and pre-invoice data for analysis has arisen. For example, a corporation may monitor reservations made by their employees to prevent excess travel. Also, pre-ticketed data can be monitored to determine the number of people going to the same destination, so that a possible group rate may be negotiated by the travel agent. A system, developed by the assignee of the present invention and made in accordance with the invention disclosed in U.S. patent application Ser. No. 08/317,860, which is herein incorporated by reference, is such a mid-office system that provides reporting capabilities utilizing both pre-ticketed and post-ticketed data.

Until the discovery of the present invention, corporations only periodically received the travel reservation information stored in their travel agencies' back-office or mid-office systems. Typically, the information is distributed to the corporations via diskettes, magnetic tape, or paper and delivered to the corporation by mail, courier, or the like.

There are problems with these methods of transmitting travel information. First, if the information is being transmitted in different currencies, each individual transaction amount field must be converted to a common reporting currency before being evaluated. As exchange rates change every day, the day of the transaction and the exchange rate on that day must be considered when performing the conversion or else the conversion information may not be representative of the money spent on the transaction date.

In practice, an average exchange rate for the period of interest is used for currency conversion, which inherently introduces error in to the determination of travel expenses. For example, a corporation may use the average exchange rate for a thirty day period. Any daily deviations from the average that may significantly impact the price of the travel are not accounted for.

Second, the travel information provided to the corporation is never current. This is a problem, because, for example, when generating a report on the money spent with a certain airline for volume discount negotiations, any tickets issued and paid for after the transmission of the travel data to the corporation would not be included in the report. If the missed information represents a significant amount of money, the corporation is not using its full bargaining power in the volume discount negotiations.

Third, if the information is transmitted from different back office systems, then all the information must be converted to a common format in order to evaluate the information. The conversion can be a very time consuming effort.

Although the current back-office and mid-office systems function well for their intended purposes, they were not designed to accept multiple currency data and, thus, were not designed to handle and separately maintain data from several countries. For example, a back-office system such as the MAX back-office system includes a database having a database file structure such as that shown in FIGS. 1a–1f (except the Tax Detail and Tax Detail Audit files shown in FIG. 1a), wherein each file is represented inside of an oval. Each file is related to another by a one-to-many primary relationship, one-to-one primary relationship, one-to-many secondary relationship, or one-to-one secondary relationship.

Each time an AIR is received from a CRS, the data in the AIR is converted by the receiving computer and stored in a relational database having the structure shown in FIGS. 1a–1f. The data is indexed and retrieved by transaction locator number.

Since the system was not designed to receive multiple currency data, because the information in the AIRs sent from the CRS was always in the same reporting currency identified in the agency profile, there is no means to distinguish an AIR record having one currency from an AIR record having another currency. All the data is stored in the same file, the Invoice Master file. As a consequence, multiple currency data would be combined together, preventing the isolation of data of one currency.

Another problem with single currency or single country systems is that they are not equipped to handle data in more than one language. Different countries may require different reporting languages. For example, a record representing the booking of a flight from New York City to Madrid generated in English would show New York as "New York." However, if the same record was generated in Spanish, then New York would be represented as "Nueva York." The single country system would only be able to report in a single language.

Also each country has an individual ticket form and ticket type. For example, Canada has the transitional automated ticket ("TAT"), a four (4) part document; the United States has the automated ticket and boarding pass ("ATB"), a single coupon document; and most other countries have the miscellaneous charge order ("MCO"). Obviously, none of the systems that are designed to receive single currency or country data are equipped to handle data having different ticket forms and types.

Another problem associated with the inability of a system to handle multiple-currency or multiple-country data is in report generation. For example, countries differ in how they present address and date information.

Yet another problem with the existing systems is the inability to download multiple currency travel data to a corporation's main frame or internal computer, to, for example, interface with the corporate general ledger.

SUMMARY OF THE INVENTION

A new method and system of consolidating at least two travel reservation information records including one or more travel segments with at least two different currencies generated from one or more a locally operated computer system has been developed to overcome the deficiencies of the prior art. This method and system are particularly suitable for companies having a significant number of employees that travel internationally for business, and thus, incur substantial travel and entertainment costs in different currencies.

In one embodiment, an operator, typically a person needing to access information consolidated with multiple travel segments selects a global currency in which to represent prices associated with each travel segment. Then the same or another operator, such as a travel agent, enters a first locally operated computer system and acquires a first computer travel reservation information record with the price of at least one travel segment represented in a first currency from a computer reservation system (CRS). When the record is received, the price of each segment is represented in the global currency and stored along with information from the computer travel reservation information record in the global data storage medium, which is preferably a database. It is not necessary that all the information in the record be stored. If the currency in the computer travel reservation record is not the global currency, then the currency is converted before it is stored in the global data storage medium.

Then, a second locally operated computer system is entered into by the same or another operator, such as a travel agent to acquire a second computer travel reservation information record with the price of at least one travel segment in a second currency from the computer reservation system (CRS). The price of each segment in the second computer travel reservation information record is represented in the global currency and stored along with information from the second computer travel reservation information record (could be the entire record) in the global data storage medium. Again, if the second currency in the computer travel reservation record is not the global currency, then the second currency is converted to the global currency before it is stored in the global data storage medium.

The first locally operated computer system can be in a first country with the first currency being the currency of the first country and the second locally operated computer system can be in a second country with second currency being the currency of the second country. The term "country" as it is used to this application, applies to any geopolitical entity or association that issues or uses a unique currency.

Once the data is stored in the global data storage medium, the data can be accessed for display or report generation from an operational center computer, any of the locally operated computers, or any other system capable of accessing the global storage medium.

Instead of accessing travel reservation information records from a single CRS, records could be generated from two or more separate CRSs.

Two locally operated computer systems are not necessary to practice this invention. A single locally operated computer system may be capable of requesting travel information records that include prices reflected in different currencies. Therefore, once a global currency is selected in which to represent prices associated with each travel segment, then a first computer travel reservation information record with price of at least one travel segment in a first currency, is acquired from a computer reservation system (CRS) in the locally operated computer system. The price of each segment is represented in the global currency and stored along with information from the computer travel reservation information record in the global data storage medium. If the currency in the computer travel reservation record is not the global currency, then the currency is converted before it is stored in the global data storage medium. Then, once a second computer travel reservation information record with price of at least one travel segment in a second currency from the computer reservation system (CRS) is acquired, the price of each segment is represented in the global currency and stored along with the information from the second computer travel reservation information record in the global data storage medium. Again, if the second currency in the computer travel reservation record is not the global currency, then the second currency is converted before it is stored in the global data storage medium.

Also disclosed is a system for centralizing in a predetermined global currency travel reservation information having at least two different currencies generated from locally operated computer systems for subsequent analysis. The system includes first and second locally operated computer systems, a global data storage medium (preferably a database) and at least one computerized reservation system (CRS) accessible by the first and second locally operated computer systems that has the capability of generating at least one travel segment and price associated with each segment, of booking reservations for a selected segments, of generating travel reservation information in response to a request by the first or second locally operated computer systems, and of detecting the booking of a reservation with the price of each booked segment. Also included is means for representing the price of each booked segment in the predetermined global currency, means for transferring segment reservation information and the global currency representation of the price of each booked segments to the global data storage medium, and means for storing the transferred segment reservation information and the price of each booked segment in the global currency in the global data storage medium.

If the currency in the computer travel reservation record is not the global currency, then the means for representing the currency in the global currency performs a conversion of the recorded currency to the global currency.

The term "book" includes, but is not limited to, reserving available travel and being wait-listed for travel that is already booked to capacity.

It is also not necessary that the price information be represented in the global currency before transmitting to the global data storage medium. The representation in the global currency could take place after transmission, but before storing.

The first and second locally operated computer system can be and typically are located in a remote location from the CRS and include communication mechanisms to transfer data between the systems. The communication means could be any mechanism to transmit data such as a communication modem, phone lines or satellites, or any other type of electronic transfer means.

The first locally operated computer system can be in a first country with the first currency being the currency of the first country and the second locally operated computer system can be in a second country with second currency being the currency of the second country.

Again, this embodiment of the invention also applies to a single locally operated computer system capable of accessing travel information records having different currencies.

The computer travel reservation information record may consist of pre-ticketed information or ticketed information.

Once the data is stored in the global data storage medium, the data can be accessed for display or report generation from an operational center computer, any of the locally operated computers, or any other means capable of accessing the global data storage means, including, but not limited to a corporate internal computer system.

Instead of accessing the travel reservation information record from a single CRS, records could be generated from two separate CRSs.

A method for consolidating travel reservation information generated from locally operated computer systems in at least two countries is also disclosed. The method includes selecting a global currency in which to represent price associated with each travel segment, entering a first locally operated computer system in a first country having a first country currency, accessing a computer reservation system (CRS) from the first locally operated computer system, generating, in the CRS, at least one travel segment for a traveler, selecting at least one travel segment with a price of the selected segment for booking, booking a reservation at the price in the CRS for each selected travel itinerary, representing the price of the travel segment in the global currency, storing information regarding the booked travel segment and the price in the global currency in the global data storage medium, entering a second locally operated computer system in a second country have a second country currency, accessing the CRS from the second locally operated computer system, generating, in the CRS, at least one travel segment for a traveler in the second country, selecting at least one second travel segment with price of the second travel segment for booking using the second locally operated computer system, booking a reservation at the price in the CRS for the second travel segment, representing the price of the second travel in the global currency, and storing information regarding the second booked travel segment and the price in the global currency in the global data storage medium.

Another method is disclosed for reporting travel reservation information generated from at least one locally operated computer system and at least one computer reservation system (CRS) and stored in a global data storage medium. The method includes the steps of selecting a company reporting format that includes at least a reporting language and a global currency, storing company reporting format in the global storage medium, including reporting language, and a global currency, entering a locally operated computer system, accessing a computer reservation system (CRS) from the locally operated computer system generating, in the CRS, at least one travel segment, selecting at least one travel segment, including price of the selected segment, for booking, booking a reservation at the price in the CRS for each selected travel segment, representing the price of the segment in the global currency, storing information regarding the booked travel segment and the price in the global currency in the global storage medium, accessing the company reporting format and the stored booked travel segment and price in the global currency information in the global storage medium, and reporting the booked travel segment and price information in the company reporting format. The company reporting format may also include a reporting address format and a reporting date format. The information of the company reporting format may be stored in a single file or several files.

The computer travel reservation information record referenced above may consist of pre-ticketed information or ticketed information. It may also consist of all the information stored in the CRS (for example, that stored in a PNR) or may be selected information such as that transferred in an AIR.

A travel segment, such as that referenced above, may represent any type of travel, including but not limited to, air, rail, car, ferries, and cruises.

BRIEF DESCRIPTION OF THE DRAWING

In the Drawings:

FIGS. 1a–1f show a schematic representation of the structure of a logical database design structure associated with a single currency back-office system.

FIG. 4 is an illustration of the form of raw data available in a PNR generated by a typical CRS system.

FIG. 5 is an illustration of a representation of an AIR record including items selected from a PNR.

DESCRIPTION OF THE PREFERRED EMBODIMENTS

Figure 1A:
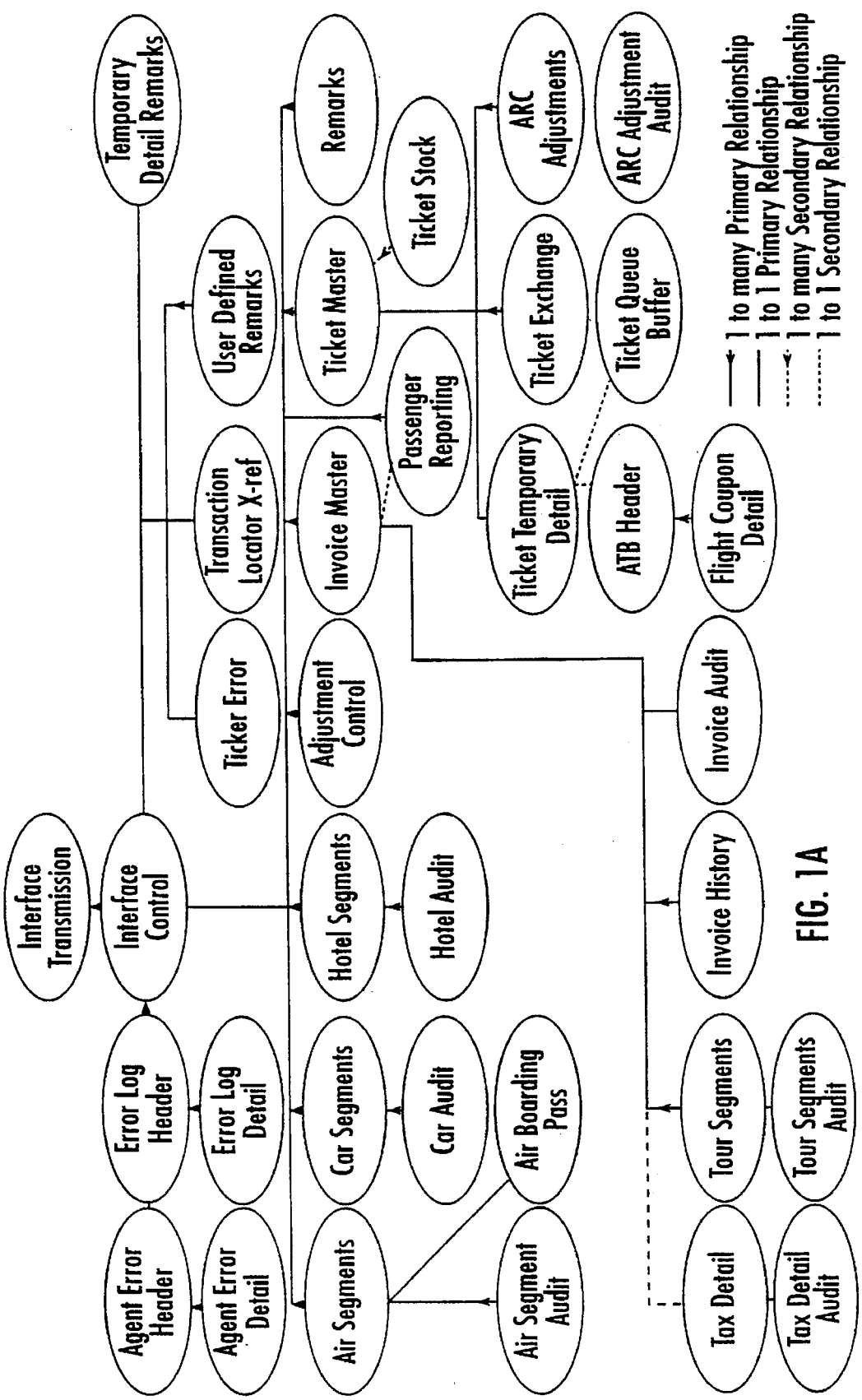
Figure 1F:
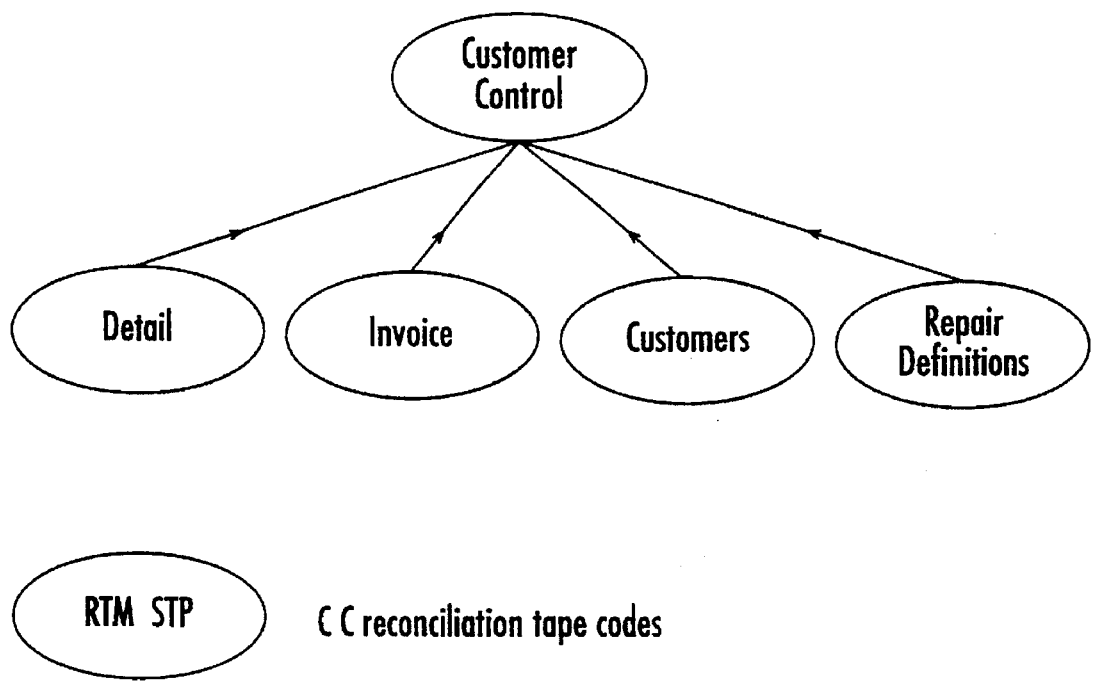
Figure 2:
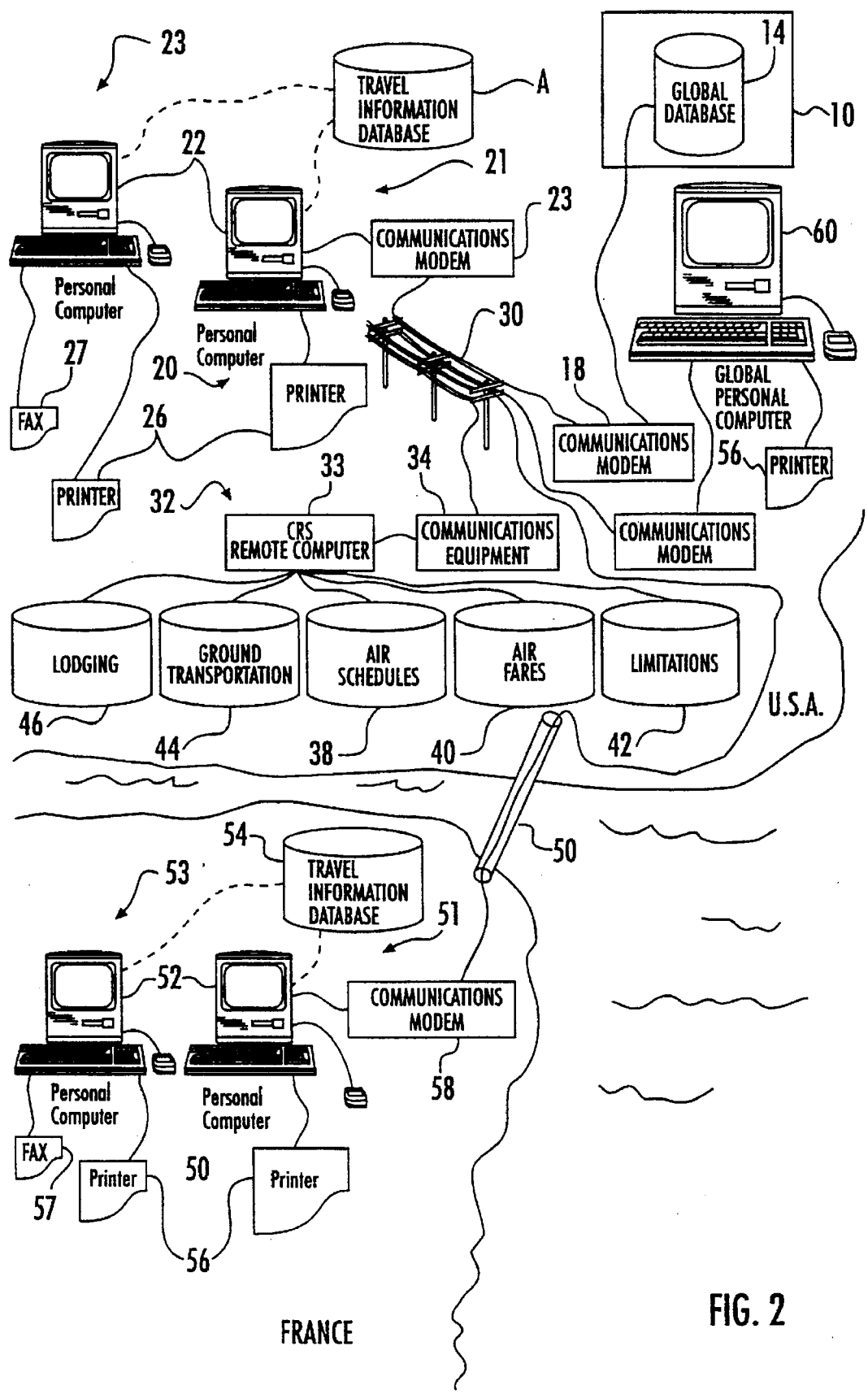
FIG. 2 is a schematic view of a system in accordance with the present invention.

Referring to the drawings, in FIG. 2 systems for managing consolidated multiple currency travel reservation information include global computer 10 (which in the preferred embodiment of this invention is an AS400 computer, marketed by International Business Machines), and global data storage medium 14 (which in the preferred embodiment of this invention is the AS400 relational database or the equivalent programmed in an object oriented manner as is well known to those of ordinary skill in the art) for storing travel reservation information generated in at least two currencies, which in this case come from two different countries. Modem 18 is connected via land lines 30 to a remotely maintained computer systems 32 and at least two system for gathering travel reservation data 20 and 50 in two different countries. These systems could be located at travel agencies or within a corporation, but for illustrative purposes, the travel agency will be used. Each system 20 and 50 includes travel agency locally operated computer systems 21 and 51 and optional locally operated computer systems 23 and 53 having terminals 22 and 52, optional memory storage disks 24 and 54 for storing pre- and post-ticketed travel information, optional printers 26 and 56, communications modems 28 and 58, and any other optional peripheral devices such as facsimile machine 27 and 57. Modem 28 is connected via land lines 30 to remotely maintained computer system 32 and modem 58 is connected via fiber optic cable lines 50 and land lines 30 to remotely maintained computer system 32. Computer system 32 includes communication interface equipment 34, computer 36, and a plurality of memory storage disks 38, 40, 42, 44, and 46, accessible by travel providers such as lodging providers, ground transportation providers, and airlines.

Another optional component of this system is operational center computer 60. This component is typically not configured to generate and book itineraries through the CRS, but is designed to access the consolidated information stored in global database 14 for analysis, maintenance, and report generation. Operational computer center 60 is connected to communications modems 68 to access the global database, printer 66, and any other peripheral devices such as facsimile machine.

The term "connected" as it applies to this invention means "electrically connected" and does not require physical or constant connection. Therefore, the connection may only be for a short period of time.

Remote computer system 32 is a computer reservation system ("CRS"), which is well known to those of ordinary skill in the art. Typically, CRSs include a large mainframe, capable of processing significantly large amounts of data. CRSs are designed to provide travel itineraries and travel booking to locally operated terminals in many different countries. There are several CRS providers including the assignee of this invention.

The term "CRS" includes any system that receives, stores, processes, and/or transmits travel related information to and from another system, including, but not limited to, rental car company computer reservation systems, cruise company computer reservation systems, and hotel computer reservation systems.

Figure 3:
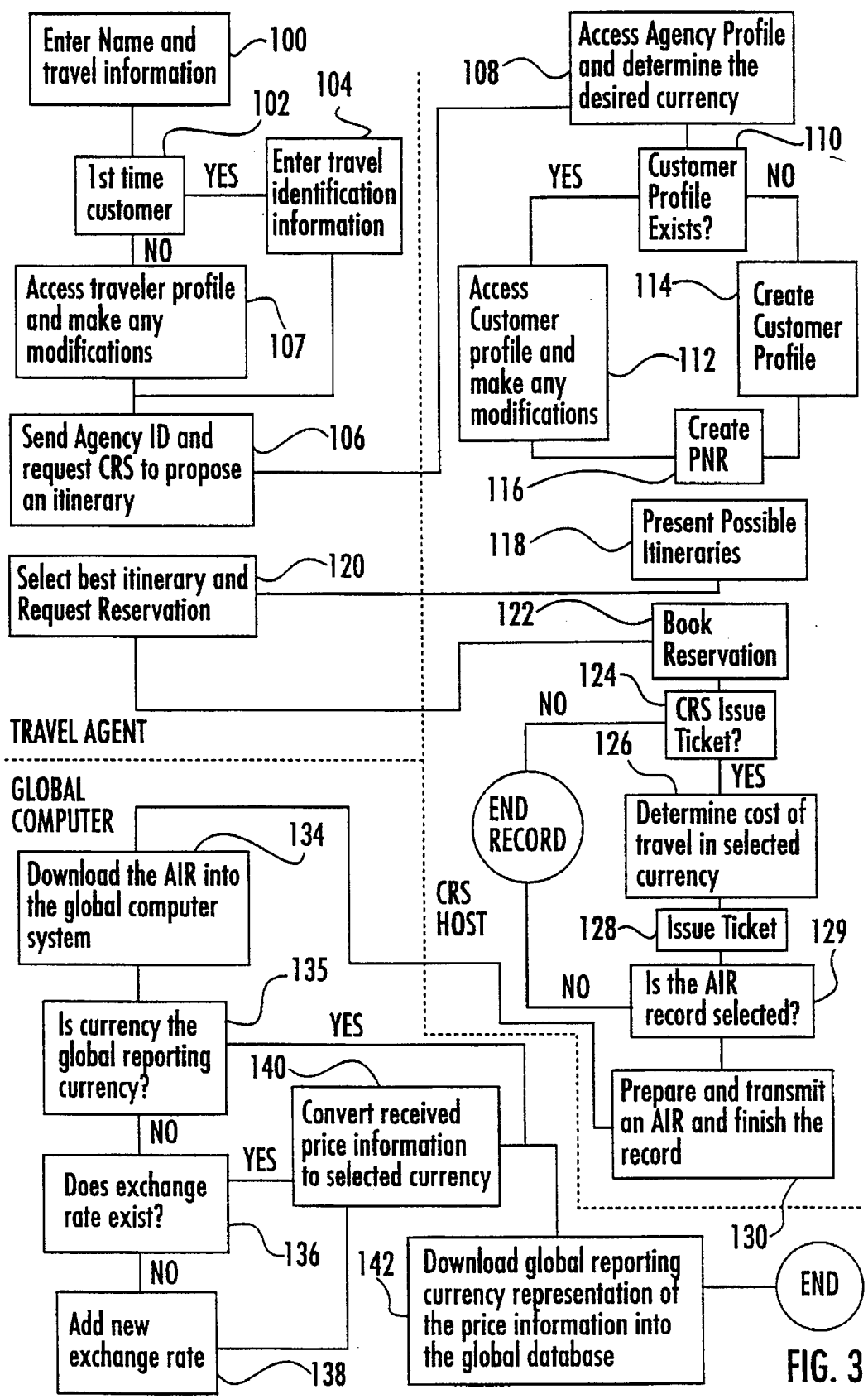
FIG. 3 is a logical flow diagram showing the overall operation of the present invention.

FIG. 3 shows a process for automatically transferring the travel reservation information from a CRS to a global database once the reservation is ticketed in its broadest sense depicted in flow chart form. This process could be modified by one of ordinary skill in the art in accordance with the teachings of U.S. patent application Ser. No. 08/317,860 to provide a process for automatically updating the local travel information database 24 and 54 and global database 14 every time a PNR is created or modified in the CRS. However, for purposes of illustration, the process utilizing ticketed information will be described.

In this embodiment of the invention, the process is essentially performed by software executed in three locations. The first part of the software is installed on a travel agent's locally operated computer system, the second part is installed on the remote CRS host computer, and the third part is installed on the global computer. The three portions of the software communicate with each other to execute a request for a proposed itinerary, book a reservation for a traveler, and store selected information to global database 14.

Regardless of the country in which the travel agency resides, when making a reservation for a traveler, the travel agent enters the traveler's name and travel information, step 100. The system automatically determines if the traveler is a first-time customer, step 102. If the traveler is a first-time customer, then the agent enters traveler identification information about the customer, step 104, such as, the address, method of payment and any special travel requirements and the desired travel information. Then the agent requests access to the CRS host to obtain itineraries, step 106. If a profile exists, then it is accessed and modified if necessary, step 107, before accessing the CRS.

Each locally operated computer system that is configured for connection to CRS remote computer system 36 is assigned an agency identification number ("ID"). An agency profile corresponding to the agency ID, is stored at the CRS host. The profile contains all relevant information regarding the agency, including data paths, security access codes, and desired transaction currency. One specific type of information available pertaining to this invention is whether or not the agency requested that an accounting interface record ("AIR") be generated automatically every time a reservation is ticketed. An AIR is a record temporarily generated by the CRS, including both traveler identification information, ticketed travel itinerary reservation information, and segment price information, which will be transmitted to a location, such as the agency or, in this case, global computer 10. Thus, when the agency requests access to the CRS host, the agency ID is automatically sent to the CRS host to identify the locally operated computer system requesting access, step 106.

Once the CRS host accesses the agency profile pursuant to the agent ID, step 108, the CRS checks whether a customer profile exists, step 110. If a profile exists, then the computer accesses the profile and makes any necessary modifications, step 112. If a profile does not exist, then the CRS host computer creates one, step 114. Then the CRS host creates a PNR record, step 116, and develops possible itineraries, step 118, for presentation to the agent. Each itinerary is composed of individual travel segments, for example a round-trip, non-stop flight includes a two segment. The agent then selects the best itinerary and, thus, the best segments and requests a reservation, step 120. Upon receipt of the reservation request, the CRS host then books the reservation, step 122. If the CRS is not required to issue a ticket, step 124, then the record is finished.

Otherwise, the CRS proceeds with issuing the ticket. First, the price of the ticket is calculated in the currency specified in the agency profile, step 126. Most CRSs are updated on a daily basis with current currency exchange rates. Then, the ticket is issued, step 128.

If the agency profile indicates that an AIR is requested, step 129, then the CRS prepares and transmits the AIR record and ticket to the global computer, step 130. The AIR information is loaded into central global computer system 10, step 134.

Once the information is received, the computer determine whether the price of the segment in the AIR is reflected in the same currency as a predetermined global currency. If the price is in the global currency or global reporting currency, then the global reporting currency representation of the price information is loaded into global database, step 142. The system is designed to allow a user to specify at least a primary currency for storage and reporting purposes. For the purposes of this discussion "global currency" and "primary currency" are used interchangeably.

If the currency in the AIR is not the global reporting currency, then global computer 10 determines if the exchange rate exists, step 136. If not, then a new exchange rate(s) must be added, step 138. Otherwise, the system utilizes the existing rates which should be updated. This step could be performed automatically if the exchange rate is provided from a source capable of transmitting electronic data such as the CRS, Reuters Telerate, or any other source of electronic exchange rates. It is, however, preferable for an authorized person to input the information manually. In addition to the exchange rate sources mentioned above, the information is available in financial periodicals and electronic services. The received price information is converted, step 140, and loaded and along with the other received information into global database 14, step 142.

If the AIR option is not selected, then the CRS host immediately issues the ticket and finishes the record, step 124.

In order to prepare an AIR, the CRS host parses the PNR created by the CRS, as shown in FIG. 4, step 130. The host selects which information from the PNR is necessary and reformats the data for transmission to the locally operated computer system. The PNR could be directly downloaded to the global database. However, it is much more efficient to format the data in the host, which facilitates the downloading of the data at the global database.

It is well known to those skilled in the art that any information selected from the PNR could be arranged in any number of ways. Also, it is well known that the information could be stored in any storage medium rather than a database.

It is also well know to those of ordinary skill in the art that any or all information in the PNR can be transferred.

In the preferred embodiment of this invention, the information from the PNR is stored in the AIR in a number of predetermined fields, each represented by a specific code. FIG. 5 shows an example of an AIR developed from a PNR of a passenger flying from Acapulco, Mexico to Cancun, Mexico on Mexicana Airlines. However, each AIR will vary depending on the travel information.

In the embodiment of the invention described above, the information from the AIR is then downloaded into central global computer database 14. The information can be loaded into any database utilizing any database management systems, such as AS400 relational database.

The process described above could be modified by one of ordinary skill in the art to include enhancements that make the over all system more efficient. For example, the system could be reconfigured such that different component perform different functions. The AIR could be loaded into any storage medium, which can be accessed for subsequent processing of the data in the AIR.

Figure 6:
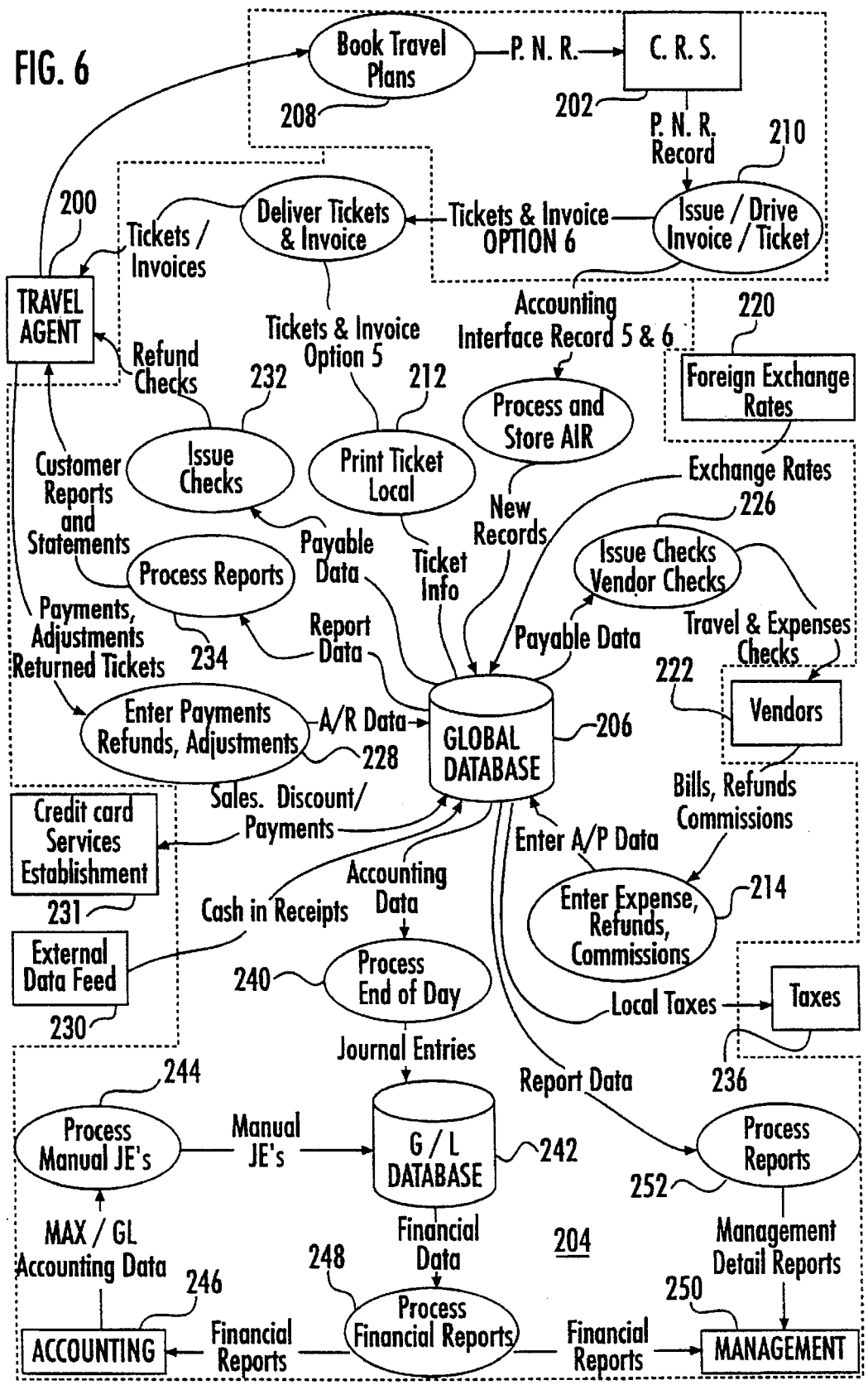
FIG. 6 is a schematic view of the system data flow of the preferred embodiment of the present invention.

FIG. 6 shows a flow diagram of an enhanced version and the preferred embodiment of this invention, wherein travel agency 200 operates a locally operated computer to access CRS 202 and global computer 204. The travel reservation information generated by the CRS is stored in a remote data storage medium, such as global database 206 controlled by remote global computer system 204.

In FIG. 6, a travel agent at travel agency 200 requests, books, and tickets travel itineraries in the CRS, step 208, in the same or similar manner to that as shown in FIG. 3, steps 100–192. As stated above, this process could be modified in accordance with the teachings of U.S. patent application Ser. No. 08/317,860 to provide pre-ticketed data from CRS 208, but for discussion purposes, only the system utilizing ticketed data is described.

In this embodiment of the invention, an operator may select whether to have the tickets issue from CRS 202, step 210, or from global computer 204, step 212. Regardless of which equipment issues the ticket, the CRS provides an AIR record to global computer 204, which is then processed, step 213, and stored in global database 206, step 213.

Global computer 204 is designed to accept, process, and if necessary to store information from several other sources. For example, the system is designed to accept foreign currency exchange rate information 220. This information can be received from any of the sources from the description of FIG. 3 above. The system is also designed to interface with vendors 222 and allow them to provide expense, refund, and commission information 224 to global database 206. Information is used for reconciliation, reporting, and vendor settlements. Vendors 222 then are able to receive payable information, vendor checks 226, from the database such as travel and expense checks.

Global computer 204 also accepts information regarding: payments, refunds, adjustment, and returned tickets 228 from customers through travel agency 200; cash in receipts from retail point-of-sale operation from external data feed 230; and sale, discount, and payment information from credit card service establishments 231. Global computer 204 could be programmed to accept other type of information by one of ordinary skill in the art.

With all the information provided by the sources mentioned above, global computer 204 is capable of issuing checks in any selected language 232 and generating reports 234 for travel agency 200 and providing sales information, discounts, and payment to credit card service establishments 231. The sales information and the country of origin information allow global computer 204 to also generate local tax information 236 that can be used for many purposes including, but not limited to, obtaining refund of sales taxes paid in certain countries.

In addition to all the features mentioned above, the system shown in FIG. 6 performs all of the functions of the currently marketed MAX back office accounting system, marketed by the assignee of the present invention. These features include end-of-the-day processing 240, a general ledger database 242, process and generate financial reports 248 for both management 250 and accounting 246. Journal entries from accounting are also processed 244 and downloaded into general ledger database 242. The system also processes and generates reports 252 aside from strict accounting reports for management 250. Unlike all the prior systems, the reports generated by this system include travel price information in a selected currency that is real-time and accurate and are in a preselected language using a preselected date/format/separator and preselected address format.

Since an AIR is instantaneously generated every time a reservation is ticketed, the information in the global database is current with the actual prices represented in the selected currency at all times. The data is also maintained in the database until it is archived and purged. Therefore, the reports can be generated on any computer system, such as an operational center computer that includes current, accurate information providing a much more useful system.

The process for automatically updating the global travel information database 14 (FIG. 2) every time a reservation is ticketed in the CRS described above utilizes an AIR. However, the process could be modified by one of ordinary skill in the art to download any type of travel reservation information. The information could include any type of record. For example, the travel reservation information in the PNR could be directly downloaded from the PNR to the global computer system upon detection of the ticketing of a reservation. No AIR is required.

The system could also be modified to accept travel reservation information from other CRSs. Either the information must be sent in the form of an AIR or another format from another CRS recognized by the global computer system, so that any relevant information may be extracted.

Figure 7A:
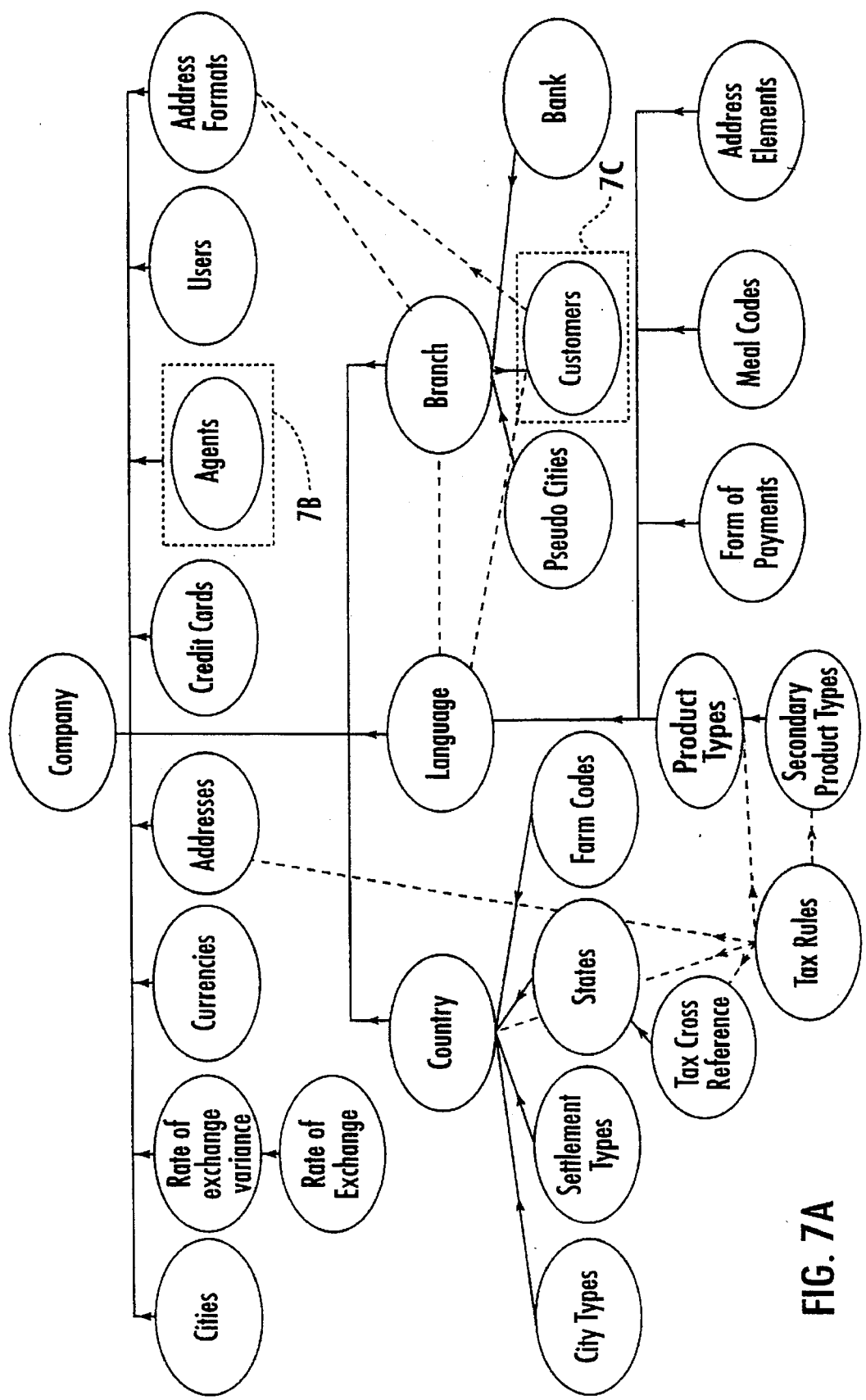
FIGS. 7a–7d show a schematic representation of the structure of the logical database design and associated database relationship that comprise the global database of FIG. 6.
Figure 7B:
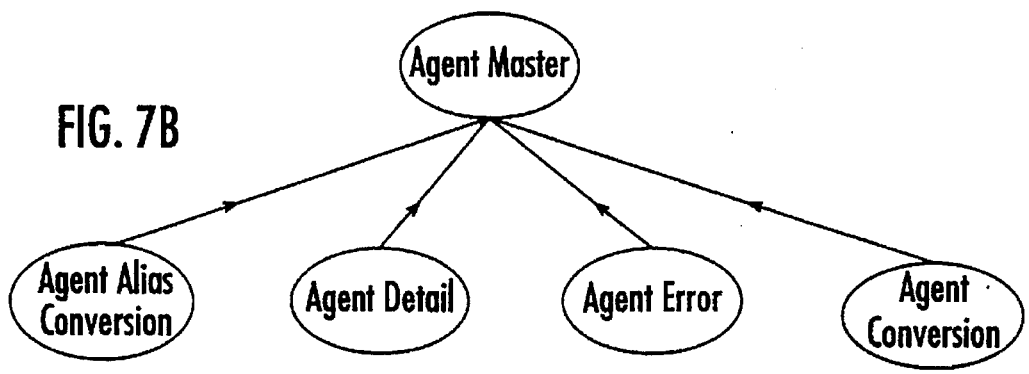
Figure 7D:
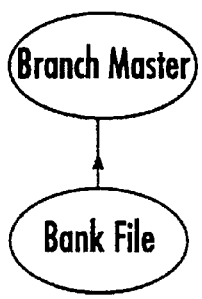
Figure 7C:
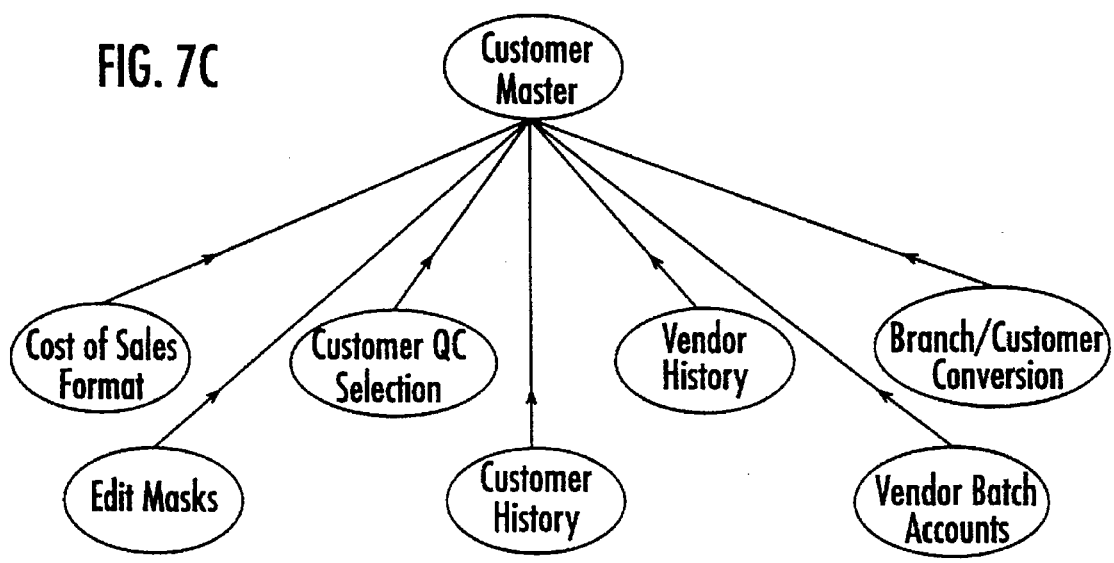

A portion of the database structure of the global database of the preferred embodiment of this invention, the company database structure, is shown in FIGS. 7a–7c. This company database structure design is implemented to compliment the existing database file structure shown in FIGS. 1a–1f. However, the same process and method (described below) could be implemented in a unique design by one of ordinary skill in the art or be implemented with any single currency or single country back-office or mid-office system well known to those of ordinary skill in the art.

Global database 206 of FIG. 6 is structured to include two functional portions; a validation portion and a travel information record storing portion. The travel information record storing portion is comprised of the files shown in FIGS. 1a–1f plus the Tax Detail and the Tax Detail Audit files. However, before the data is stored in the database, it is validated using the information stored in the portion of the database having the structure of FIGS. 7a–7d.

The validation portion allows for the handling of travel reservation data generated in multiple currencies, in multiple languages, multiple ticket forms, multiple ticket types, and multiple date formats.

FIG. 7a shows all the files of the company database structure. It is intended that a "company" represent, for illustrative purposes, a geographical or operational division of an entity using this invention. For example, an international entity having need to consolidate travel reservation information on a per country or per geographical regional basis, would set up a company database structure for each country or geographical region.

The information stored in the company database files is specific to the entity. For example, the Cities file includes all of the city codes and country codes of the cities to which customers or employees travel. The Country file contains a list of the full name of all the countries whose country codes exist in the Cities file. Since the city and country code are constant all over the world, global computer uses the codes instead of the city and country name to avoid miss spellings or variations in spelling.

All of the other files contain similar information as follows. For example: the City Types file contains codes that pertain to the type of city; the Settlement Types file contains information that identifies the type of method used for reporting/processing within a Company, such as Airline Reporting Corporation ("ARC"), Bank Settlement Plan ("BSP"), or Direct Form of Payment ("DFOP"); the States file contains the authorized postal abbreviations and associated names for each state, province or county; and the Form Codes files contain all specific criteria regarding ticket forms.

The Tax Cross Reference files contains the valid tax codes for each state, province or county in a country and the Tax Rules file contains rules and regulations for applicable taxes in each country. These files are accessed by global computer 204 to determine applicable taxes for a state, province, or county, to validate the tax codes, and to calculate the taxes on commission income and credit card service charges by processes well known to those of ordinary skill in the art.

The Language file contains attributes needed to specify a desired language by country specification.

The Product Types file consists of the codes used to identify and classify types of services rendered. While the Secondary Product Types file includes information on specific types of service within a product type.

The Form of Payments file contains all specific criteria regarding forms of payment on an invoice.

The Meal Codes file contains codes and descriptions used by airlines for each menu.

The Address Elements file contains specific data elements defining fields of a given address lay out.

The Branch file lists all the branches (include name, address, etc.) that are part of the global system along with bank accounts and pseudo cities as shown in FIG. 7d branches.

The Customers file includes customer and vendor identification information, such as name, address, etc. FIG. 7c shows a file information break down. The information stored in these files includes (from left to right) charts of account information for sales/cost of sales, edit masks for quality control, quality control selections, summary of activity for a customer with number and amount of tickets and refunds by month, vendor summary information, accounting chart information for each vendor and branch, and conversion information to cross-reference information in other back-office systems to the present invention.

The Bank file defines the system bank accounts.

The Credit Card file contains credit card codes for service establishment processing.

The Agents file includes all agent numbers and names and is broken down in to the files shown in FIG. 7b which contain agent sines (duty codes), summary of agent activity including number and amount of tickets and refunds, quality control for each agent, and conversion information to cross-reference agency numbers from other back-office systems to a unique number in the present invention.

The User file contains user preference attributes and specific operating characteristics, such as date formats.

The Address Formats file contains all address elements available for user selection.

The Rate of Exchange Variance and Rate of Exchange files contain all the rates of exchange that may be necessary to convert the travel segment prices to the primary reporting or global currency. The currency file contains the designated primary reporting currency and any other secondary reporting currencies. Once Global computer 204 receives an AIR, it accesses the currency database to determine the primary or global reporting currency. Then, it compares the currency in the AIR to the global currency. If the currencies are different, then global computer access the Rate of Exchange Variance and Rate of Exchange files (which should be updated frequently to reflect the accurate exchange rate) to acquire the exchange rate to convert the AIR currency to the global currency. Then, global computer 204 stores the price in both the original and global currencies in the Invoice Master files and subfiles of the storing database structure shown in FIG. 1a.

After step 140 of FIG. 3 is executed, the AIR is parsed to find the agency number, from which the company can be determined. Once the company is determined, then the system access the company structure portion of the database to determine the primary reporting or global currency. Then the conversion and storing process described in the previous paragraph is executed.

Many of the entries in the company database structure are used for reporting purposes. For example, a company database can be set up for a company in Canada, specifying that all reports be generated in French by placing French in the language field and that all addresses be reported in the format stored in the Address Format file. Date formats are also used for displaying or reporting and are specified in the Company, Branch, Customer and Bank files, depending on the hierarchy or the function. Thus, when the proper formats are determined from the company structure database, the storing database is accessed to acquire the appropriate data that needs to be reported.

The foregoing software was developed in RPG/400 and CLP/400 using object oriented based techniques and structured methodology bases. However, it will be obvious to anyone of ordinary skill in the art that the aforementioned program may be developed in a different programming language using non-object oriented techniques. Even though the relational database package was used, the foregoing database configuration could be implemented in an object-oriented database or any other type of storage medium by one of ordinary skill in the art. All the equipment described in the above travel reservation system is readily available.

The embodiments of the invention described above all utilize a database in the locally operated and global computer system. However, any type of storage means may be used for storing the data. It is also not necessary that the locally operated computer system have databases, all information could be generated from the global database. In the alternative, the global database could be located at one of the locally operated computer system sites, wherein access for the other locally operated computer systems is provided.

The term "locally" is only use for illustrative purposes. For example, the operational center computer may also be located at one of the locally operated computer system sites and have access the CRS. It is not required that the operational center computer be a stand-alone system, however, it is desirable.

The systems and methods described above could be modified by one of ordinary skill in the art to incorporate the functionality of the global computer or an global computer into a centralized processing system or service bureau, such as the one provided by the assignee of the present invention, so that several companies or agencies could remotely or locally access a single global computer for centralizing travel reservation information in a predetermined global currency.

The systems and methods described above could be modified by one of ordinary skill in the art to a systems and methods using only one locally operated computer system capable of generating computer travel reservation information including different currencies that require converting before being loaded into the database.

The conversion of the currency can occur anywhere in the system or method as long as it occurs before the data is stored in the global data storage medium.

Also, the methods and systems described above could be altered to accept data manually or via electronic systems such as the Internet. The system described above could also be easily modified to provide the ability to access other electronic services or systems, such as the Internet.

The methods and systems described above could be modified by one of ordinary skill in the art to interface to a corporations main frame or internal computer system to exchange information. For example, the information from the global computer at a travel agency or corporate internal travel department could be down loaded into the main frame of a corporations to be entered into the corporations general ledger.

From the foregoing it will be seen that this invention is one well adapted to attain all of the features and objects hereinabove set forth, together with other advantages which are obvious and which are inherent to the methods and apparatuses.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method of consolidating at least two travel reservation information records with at least two different currencies generated from a locally operated computer system, comprising the steps of selecting a global currency in which to represent prices associated with each travel segment, entering a first locally operated computer system, acquiring, in the first locally operated computer system, a first computer travel reservation information record with price of at least one travel segment represented in a first currency from a computer reservation system (CRS), representing the price of each segment in the global currency, storing information from the computer travel reservation information record and the price of each segment in the global currency in a global data storage medium, entering a second locally operated computer system, acquiring, in the second locally operated computer system, a second computer travel reservation information record with price of at least one travel segment represented in a second currency from the computer reservation system (CRS), representing the price of each segment in the second computer travel reservation information record in the global currency, and storing information from the second computer travel reservation information record and the price of each segment from the second record in the global currency in the global data storage medium.

2. The method of claim 1, wherein the computer travel reservation information record contains pre-ticketed information.

3. The method of claim 1, wherein the computer travel reservation information record contains ticketed information.

4. The method of claim 1, wherein the first locally operated computer system is in a first country with the first currency being the currency of the first country and the second locally operated computer system is in a second country with second currency being the currency of the second country.

5. The method of claim 1, wherein the global data storage medium is a database.

6. The method of claim 1, additionally comprising the steps of accessing the global data storage medium, and generating at least one report utilizing travel segment and converted price information stored in the global data storage medium.

7. The method of claim 6, wherein the information is displayed on an operational center computer.

8. The method of claim 6, wherein the report is printed from an operational center computer.

9. The method of claim 1, additionally comprising the steps of storing the price of the segments in the original currency in the global storage medium.

10. The method of claim 1, additionally comprising the step of downloading the information stored in the global storage medium to a corporate internal computer system.

11. A method of consolidating at least two travel reservation information records with at least two different currencies generated from locally operated computer systems, comprising the steps of selecting a global currency in which to represent prices associated with each travel segment, entering a first locally operated computer system, acquiring, in the first locally operated computer system, a first computer travel reservation information record with price of at least one travel segment represented in a first currency from a first computer reservation system (CRS), representing the price of each segment in the global currency, storing information from the computer travel reservation information record and the price of each segment in the global currency in the global data storage medium, entering a second locally operated computer system, acquiring, in the second locally operated computer system, a second computer travel reservation information record with price of at least one travel segment represented in a second currency from a second computer reservation system (CRS), representing the price of each segment in the second computer travel reservation information record in the global currency, and storing information from the second computer travel reservation information record and the second price of each segment from the second record in the global currency in the global data storage medium.

12. A method of consolidating at least two travel reservation information records with at least two currencies generated from a locally operated computer system, comprising the steps of selecting a global currency in which to represent price associated with each travel segment, entering a locally operated computer system, acquiring, in the locally operated computer system, a first computer travel reservation information record with price of at least one travel segment represented in a first currency from a first computer reservation system (CRS), representing the price of each segment in the global currency, storing information from the computer travel reservation information record and the price of each segment in the global currency in a global data storage medium, acquiring, in the locally operated computer system, a second computer travel reservation information record with price of at least one travel segment represented in a second currency from the computer reservation system (CRS), representing the price of each segment in the global currency, and storing information from the second computer travel reservation information record and the second price of each segment from the second record in the global currency in the global data storage medium.

13. The method of claim 12, additionally comprising the steps of acquiring, in the locally operated computer system, a third computer travel reservation information record with price of at least one travel segment represented in a currency from a second computer reservation system (CRS), representing the price of each segment in the global currency, and storing information from the third computer travel reservation information record and the price of each segment from the third record in the global currency in the global data storage medium.

14. A system for centralizing and standardizing in a predetermined global currency travel reservation information having at least two different currencies generated from locally operated computer systems for subsequent analysis, comprising a first locally operated computer system, a second locally operated computer system, a global data storage medium, at least one computerized reservation system (CRS) accessible by the first and second locally operated computer systems that has the capability of (a) generating at least one travel segment and price associated with each segment, (b) booking reservations for a selected segments, (c) generating travel reservation information in response to a request from the first or second locally operated computer systems, and (d) detecting the booking of a reservation with the price of each booked segment, means for representing the price of each booked segment in the predetermined global currency, whereby each price that is not in the global currency is converted to the global currency, means for transferring segment reservation information, and the global currency representation of the price of each booked segments to the global data storage medium, and means for storing the transferred segment reservation information, and the price of each booked segment in the global currency in the global data storage medium.

15. The system in accordance with claim 14, wherein the first and second locally operated computer systems are connected to the CRS through communication means.

16. The system in accordance with claim 15, wherein the communication means includes a communication modem and phone lines.

17. The system in accordance with claim 15, wherein the global storage medium includes a database.

18. The system in accordance with claim 14, wherein the first and second locally operated computer systems access different CRSs.

19. A system for centralizing and standardizing in a predetermined global currency travel reservation information generated in at least two different currencies from a locally operated computer system for subsequent analysis, comprising a locally operated computer system in a country, a global data storage medium, at least one computerized reservation system (CRS) accessible by the locally operated computer system that is capable of (a) generating travel segments and prices associated with each segment, (b) booking reservations for a selected segments, (c) generating travel reservation information in response to a request from the locally operated computer system, and (d) detecting the booking of a reservation with the price of each booked segment, means for representing the price of each segment in the predetermined global currency, whereby each price that is not in the global currency is converted to the global currency, means for transferring segment reservation information, the global currency representation of the price of each booked segments to the global storage medium for downloading into the database, and means for storing the transferred segment reservation information, and the converted price of each booked segment in the global data storage medium.

20. A system for centralizing and standardizing in a predetermined currency ticketed travel reservation information generated from locally operated computer systems in at least two countries for subsequent analysis, comprising a first locally operated computer system in a first country, a second locally operated computer system in a second country, a global data storage medium, at least one computerized reservation system (CRS) accessible by the first and second locally operated computer systems that has the capability of (a) generating at least one travel segment and prices associated with each segment, (b) booking reservations for a selected segments, (c) generating travel reservation information in response to a request from the first or second locally operated computer systems, and (d) detecting the ticketing of a reservation with the price of each ticketed segment, means for representing the price of each segment in the predetermined currency, whereby each price that is not in the global currency is converted to the global currency, means for transferring segment reservation information, the global currency representation of the price of each ticketed segment to the global data storage medium, and means for storing the transferred segment reservation information, and the price of each ticketed segment in the global currency in the global data storage medium.

21. A system for centralizing and standardizing in a predetermined global currency travel reservation information generated in at least two different currencies from a locally operated computer system for subsequent analysis, comprising a locally operated computer system in a country, a global data storage medium, at least one computerized reservation system (CRS) accessible by the locally operated computer system that is capable of (a) generating travel segments and prices associated with each segment, (b) booking reservations for a selected segments, (c) generating travel reservation information in response to a request from the locally operated computer system, and (d) detecting ticketing of a reservation with the price of each booked segment, means for representing the price of the segment in the predetermined global currency, whereby each price that is not in the global currency is converted to the global currency, means for transferring segment reservation information, the global currency representation of the price of each ticketed segment to the global storage medium, and means for storing the transferred segment reservation information, and the price of each ticketed segment in the global currency in the global data storage medium.

22. The system in accordance with claim 21, wherein the global storage medium includes a database.

23. A method of consolidating travel reservation information generated from locally operated computer systems in at least two countries, comprising the steps of selecting a global currency in which to represent price associated with each travel segment, entering a first locally operated computer system in a first country having a first country currency, accessing a computer reservation system (CRS) from the first locally operated computer system, generating, in the CRS, at least one travel segment for a traveler, selecting at least one travel segment with price of the selected segment, for booking, booking a reservation at the price in the CRS for each selected travel itinerary, representing the price of the segment in the global currency, storing information regarding the booked travel segment and the price in the global currency in the global data base, entering a second locally operated computer system in a second country have a second country currency, accessing the CRS from the second locally operated computer system, and generating, in the CRS, at least one travel segment for a traveler, selecting at least one second travel segment with price of the second travel segment, for booking using the second locally operated computer system, booking a reservation at the price in the CRS for the second travel segment, representing the price of the second travel segment in the global currency, storing information regarding the second booked travel segment and the price in the global currency in the global data base.

24. A method of reporting travel reservation information generated from at least one locally operated computer system and at least one computer reservation system (CRS) and stored in a global data storage medium, comprising the steps of selecting a company reporting format with a reporting language and global currency, storing company reporting format in the global data storage medium with the reporting language and the global currency, entering a locally operated computer system, accessing a computer reservation system (CRS) from the locally operated computer system, generating, in the CRS, at least one travel segment, selecting at least one travel segment with price of the selected segment for booking, booking a reservation at the price in the CRS for each selected travel segment, representing the price of the segment in the global currency, storing information regarding the booked travel segment and the price in the global currency in the global data storage medium, accessing the company reporting format and the stored booked travel segment and price in the global currency information in the global data storage medium, and reporting the booked travel segment and price information in the company reporting format.

25. The method of claim 24, wherein the company reporting format additionally comprises a reporting address format and a reporting date format.

* * * * *